(12) United States Patent
Spelt et al.

(10) Patent No.: US 11,089,801 B2
(45) Date of Patent: Aug. 17, 2021

(54) COUNTERTOP VACUUM SYSTEM

(71) Applicant: QUVA KITCHEN PRODUCTS B.V., Hilversum (NL)

(72) Inventors: Eric Spelt, Hilversum (NL); Johannes Rogier De Vrind, Groningen (NL); Jelle Wouter Wijbrandi, Groningen (NL); Dionne Ilonka Haanstra, Groningen (NL)

(73) Assignee: QUVA KITCHEN PRODUCTS B.V., Hilversum (NL)

( * ) Notice: Subject to any disclaimer, the term of this patent is extended or adjusted under 35 U.S.C. 154(b) by 182 days.

(21) Appl. No.: 16/464,841

(22) PCT Filed: Nov. 17, 2017

(86) PCT No.: PCT/EP2017/079581
§ 371 (c)(1),
(2) Date: May 29, 2019

(87) PCT Pub. No.: WO2018/099735
PCT Pub. Date: Jun. 7, 2018

(65) Prior Publication Data
US 2019/0281866 A1    Sep. 19, 2019

(30) Foreign Application Priority Data
Nov. 29, 2016   (NL) ..................................... 2017883

(51) Int. Cl.
*A23L 3/3418* (2006.01)
*A23L 3/015* (2006.01)
*B65B 31/04* (2006.01)

(52) U.S. Cl.
CPC .......... *A23L 3/3418* (2013.01); *A23L 3/0155* (2013.01); *B65B 31/04* (2013.01); *A23V 2002/00* (2013.01)

(58) Field of Classification Search
CPC ..... B65B 31/04; B65B 31/041; B65B 31/042; B65B 31/043; A23L 3/3418;
(Continued)

(56) References Cited

U.S. PATENT DOCUMENTS 7,163,409 B1    1/2007   Chen et al.
8,637,780 B2 *  1/2014   Hunt ..................... H02G 3/185
                                                          174/483
(Continued)

FOREIGN PATENT DOCUMENTS

DE    3508436 A1   9/1986
DE    3618802 A1   12/1987
(Continued)

*Primary Examiner* — Hemant Desai
*Assistant Examiner* — Linda J. Hodge
(74) *Attorney, Agent, or Firm* — Hudak, Shunk & Farine Co. LPA (57) ABSTRACT

Countertop vacuum system, including a vacuum pump, suction device, the suction device including a pop-up arrangement, adapted for being mounted in an opening of the countertop, including a movable part and a stationary part, the stationary part having connecting means for mounting in the countertop opening and below a countertop working surface, the movable part being arranged for moving relative to the stationary part and for at least partially extending through the countertop opening, a suction hose, wherein the suction hose is connected to the vacuum pump. The suction hose is arranged extendable and retractable from an inner space of the movable part to the outside of the movable part. The system further has a suction adapter connected to the suction hose, wherein the suction adapter is provided with an interface for applying suction to a container.

15 Claims, 8 Drawing Sheets

(58) Field of Classification Search
CPC ...... A23L 3/0155; A23L 3/015; A47L 7/0047;
A47L 9/0063; A47B 77/04; A47B 77/08;
A47J 43/0727; A47J 43/0722; A23V
2002/00
USPC ........... 53/510, 390, 432, 434, 512, 79, 403;
15/314, 315
See application file for complete search history.

(56) References Cited

U.S. PATENT DOCUMENTS

2005/0011166 A1* 1/2005 Germano ............. B65B 31/024
53/512
2018/0058435 A1* 3/2018 Laurent .................. F04B 37/14

FOREIGN PATENT DOCUMENTS

| | | |
|---|---|---|
| DE | 10 2007 051 053 A1 | 8/2008 |
| EP | 2062823 A1 | 5/2009 |
| EP | 2974969 A1 | 1/2016 |
| FR | 2905835 A1 | 3/2008 |
| GB | 921684 * | 3/1963 |
| WO | 2006034513 A1 | 3/2006 |

* cited by examiner

COUNTERTOP VACUUM SYSTEM

FIELD OF THE INVENTION

The invention relates to a countertop vacuum system.

BACKGROUND OF THE INVENTION

In the preservation of foodstuffs, various techniques are available such as refrigeration, deep freezing, drying, pasteurization, sterilization, etc. Moreover, the use of preservatives plays a major role in present day large scale food industry in the preservation of foodstuffs. Where refrigeration and deep freezing are not available, techniques such as canning can be utilized for long and medium time storage. Canning can comprise creating a vacuum in a food container, after the foodstuff to be preserved has been pasteurized or sterilized. The vacuum prevents oxygen from oxidizing the foodstuff and thereby from spoiling. The less oxygen is present in the food container, the better preservation of the foodstuff within the food container is achieved. Moreover, a combination of refrigeration and deep freezing can provide adequate food preservation.

As canning and tinning can be laborious, vacuum devices can be utilized for applying a vacuum to a food container containing a foodstuff to be preserved. Such vacuum devices can be available as kitchen appliances which can be adapted to create a vacuum within food containers such cans, tins, plastic bags, etc. Such a container may be provided with a suction interface which is connectable to a corresponding nozzle of the kitchen vacuum appliance.

Vacuum devices require a vacuum pump for creating the vacuum. Such a vacuum pump is usually electrically driven. For a kitchen having such a vacuum pump to be successfully used, the vacuum pump must have a considerable suction capacity, especially in professional environments, such as kitchens in public facilities such as restaurants, hotels, nursing homes, etc. In a kitchen appliance to be used on a kitchen countertop, this causes the appliance to be noisy and voluminous, which makes the continued use of the appliance uncomfortable.

Known built-in kitchen appliances, in drawers for example, require a fixed location for applying vacuum to food containers and therefore lack flexibility in type of food container and location where the apparatus is used.

SUMMARY OF THE INVENTION

It is an object of the invention to provide a countertop vacuum system which overcomes the problems and disadvantageous as described above.

The object is achieved in a countertop vacuum system, comprising a vacuum pump, suction device, the suction device comprising a pop-up arrangement, adapted for being mounted in an opening of the countertop, comprising a movable part and a stationary part, the stationary part having connecting means for mounting in the countertop opening and below a countertop working surface, the movable part being arranged for moving relative to the stationary part and for at least partially extending through the countertop opening, a suction hose, wherein the suction hose is connected to the vacuum pump. The suction hose is arranged extendable from an inner space of the movable part to the outside of the movable part. The system further has a suction adapter connected to the suction hose, wherein the suction adapter is provided with an interface for applying suction to a container.

In an embodiment, the movable part of the pop-up arrangement is slidably arranged within the stationary part. This allows the movable part to move like it extends from the stationary part.

In an embodiment, the pop-up arrangement further comprises at least one snap-fit connection between the movable part and the stationary part. This allows the pop-up arrangement to be releasably locked in a collapsed state corresponding to a retracted position.

The pop-up arrangement can further comprise at least one compressible member between the movable part and the stationary part, which allows the movable part to extend from the stationary part without user effort when released.

The pop-up arrangement further has guide means between the movable part and the stationary part, which provide a stable angular position of the moveable part relative to the stationary part of the pop-up arrangement.

In an embodiment, the movable part of the pop-up arrangement comprises an upper part for alternatively appearing above a top surface of the countertop in an operational state and staying below the countertop top surface in a resting state, wherein the aperture is arranged in the upper part, and a lower part having first guide means for cooperating with second guide means of the stationary part.

The lower part constitutes a support for the upper part allowing the upper part to appear above the countertop surface.

In an embodiment, the lower part comprises a reel for coiling up and unwinding the suction hose, and third guide means for guiding the suction hose to the aperture. By accommodating the reel and guide in the movable part, the suction hose has a short distance to bridge between reel and aperture, and can be rolled off and rewound reliably.

In an embodiment, the reel has a horizontally oriented reel axle. This allows a relatively low depth of the pop-up arrangement, having the aperture for guiding the suction hose in close proximity.

In an embodiment, the upper part has an adapter storage space for accommodating the suction adapter. The adapter storage space allows the suction adapter to be invisibly stored when the suction device is in the collapsed resting state.

In an embodiment, the adapter storage space can be provided with support elements for supporting and guiding the suction adapter. This allows the adapter to be retained in the storage space and to prevent it from falling out of the upper part when the suction device, i.e. the pop-up arrangement pops up from the collapsed state into the operational state and to guide it when taken out of the adapter storage space for use.

In an embodiment, the adapter storage space is provided with at least one control button. This allows control of the countertop vacuum system, when the adapter is extracted from the adapter storage space. Operation of the at least one control is inhibited when the suction adapter is in place in the adapter storage space.

In an embodiment, the stationary part and the vacuum pump are accommodated in a common housing at a lower side of the countertop. This allows the suction device to be marketed as a single product. The common housing may be provided with noise reduction means, to enhance comfort of use of the system.

In an embodiment, the system comprises a control unit for controlling operation of the vacuum pump. The at least one control button is communicatively connected to the control unit for controlling operation of the control unit.

In an embodiment, the suction adapter is provided with a suction channel connected to the suction hose for clearing air from a container. This allow the system to be used on the countertop surface on various food containers, having various interfaces for extracting air from the containers. Food containers may comprise boxes, plastic bags, tins, cans, etc., which can be provided with a suction opening for applying vacuum from the suction adapter.

In an embodiment, the suction channel comprises an first duct, fluidly connected to the suction opening of the adapter interface, a fluid chamber connected to the first duct, a second duct for connecting the fluid chamber with the suction hose, a fluid lock disposed between the fluid chamber and the second duct for blocking the suction channel when a fluid level in the fluid chamber exceeds a predetermined threshold.

This prevents fluids accidentally sucked up when applying vacuum to a food container containing fluids, to spill over the countertop surface, while at the same time the sucking up of the fluid is prevented. Thus the system is prevented from soiling and fouling and prevents fluid foodstuffs from spoiling within the system. Thus hygiene is maintained.

In an embodiment, the fluid lock comprises a float and a seal.

The float is pushed by the fluid level in the fluid chamber towards the seal. When the fluid level exceeds a predetermined level, the float touches the seal whereby the suction channel is closed. Thus entry of the fluid into the suction channel is prevented.

DETAILED DESCRIPTION OF EMBODIMENTS

Figure 1A:
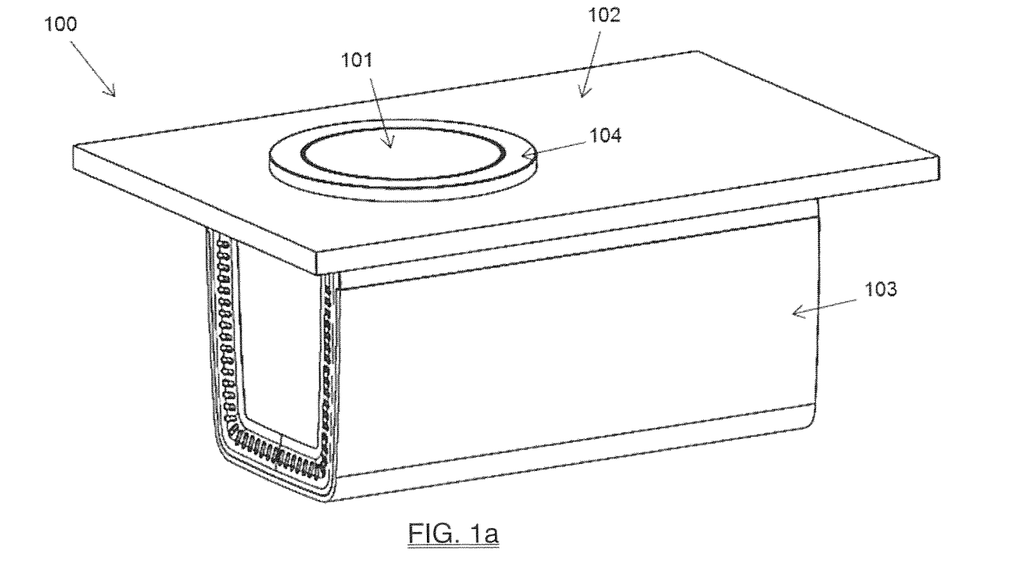
FIG. 1a-1c show an isometric view of the countertop vacuum system according to an embodiment of the invention.

In FIG. 1a a countertop vacuum system 100 is shown in a collapsed state, wherein a suction device 101 is accommodated integrated in a kitchen countertop 102. The suction device 101 comprises a pop-up arrangement which is mounted in countertop 102 using a flange 104. In the state shown in FIG. 1a the countertop vacuum system 100 is in a resting state, i.e. not in use and hidden under the countertop surface. The suction device 101 operates by means of vacuum, which can be produced by any vacuum pump 110 suitable for quickly extracting relatively large amounts of air from a container. Working pressures may be for example be attainable in a range of 200-700 mbar below atmospheric pressure as required. The suction device 101 and where applicable the vacuum pump 110 can be accommodated within a common housing 103, however the housing can be omitted, and the vacuum pump 110 can be installed anywhere convenient in connection to the suction device 101.

Figure 1B:
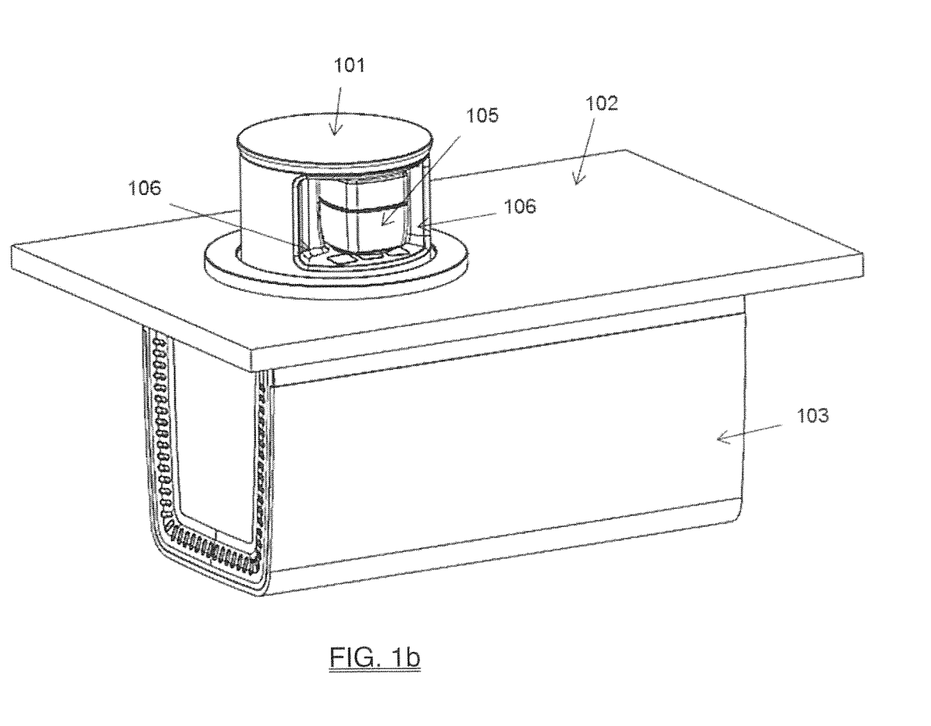

FIG. 1b shows the suction device 101 having the pop-up arrangement in a popped-up state thereby exposing suction adapter 105, which is stored within an adapter storage space 109 of the suction device 101 by means of retraction action of a suction hose 107 to which the suction adapter 105 is connected. Retention walls 106 provided within the adapter storage space 109 can be form fitted for the suction adapter 105 to allow the suction adapter 105 to be positioned and oriented to facilitate stable storage, and to provide guidance for easy withdrawal of the suction adapter from the adapter storage space 109. In this state, the suction device 101 is ready for use on the countertop 102. The countertop 102 can be part of for example a kitchen assembly in a section where food is to be preserved in food containers. The skilled person will understand that also other applications of the countertop vacuum system may apply, such as vacuum storage of compressible goods, such as clothing and other compressible objects.

Figure 1C:
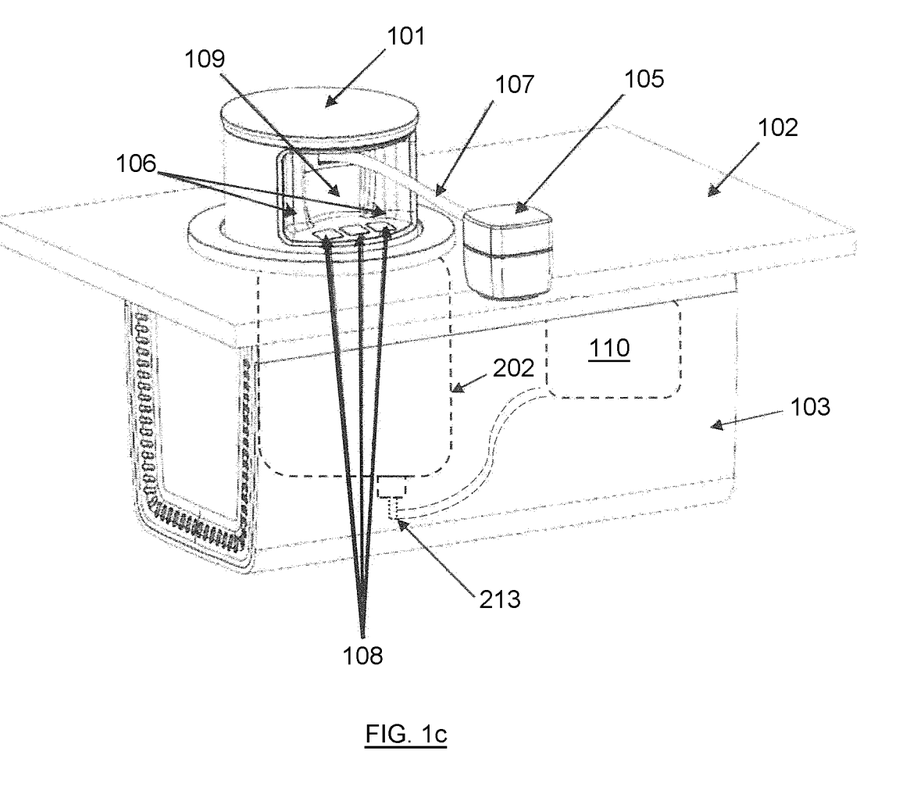

In FIG. 1c, the suction device 101 is shown in the pop-up state, i.e. operational state, wherein the suction adapter 105 is shown in an extracted state, connected via suction hose 107 to the vacuum pump 110 (not shown). In FIG. 1c also the adapter storage space 109 is shown, wherein the suction adapter 105 can be stored when not in use. With the suction adapter 105 in an extracted state, control buttons 108 may be exposed, allowing a user to operate the suction device 101, i.e. operate a control unit of the suction device. This may comprise switching on the vacuum pump 110. The control unit may be provided with a pressure sensor to measure the pressure within the suction hose and/or adapter or ducts, and may be provided with a function to switch off or disable the vacuum pump 110 when the pressure drops below a preset threshold value. This threshold value can be for example 200 mbar below atmospheric pressure in a 'gentle' mode, and for example 700 mbar below atmospheric pressure in a 'full' mode. When the pressure exceeds another preset threshold value, the vacuum pump 110 can be enabled or switched on. The mode can be preset, or selectable with the control buttons. The control unit can comprise a processor and memory, program instructions stored within the memory and inputs and outputs for controlling the various parts of the suction device.

Figure 2:
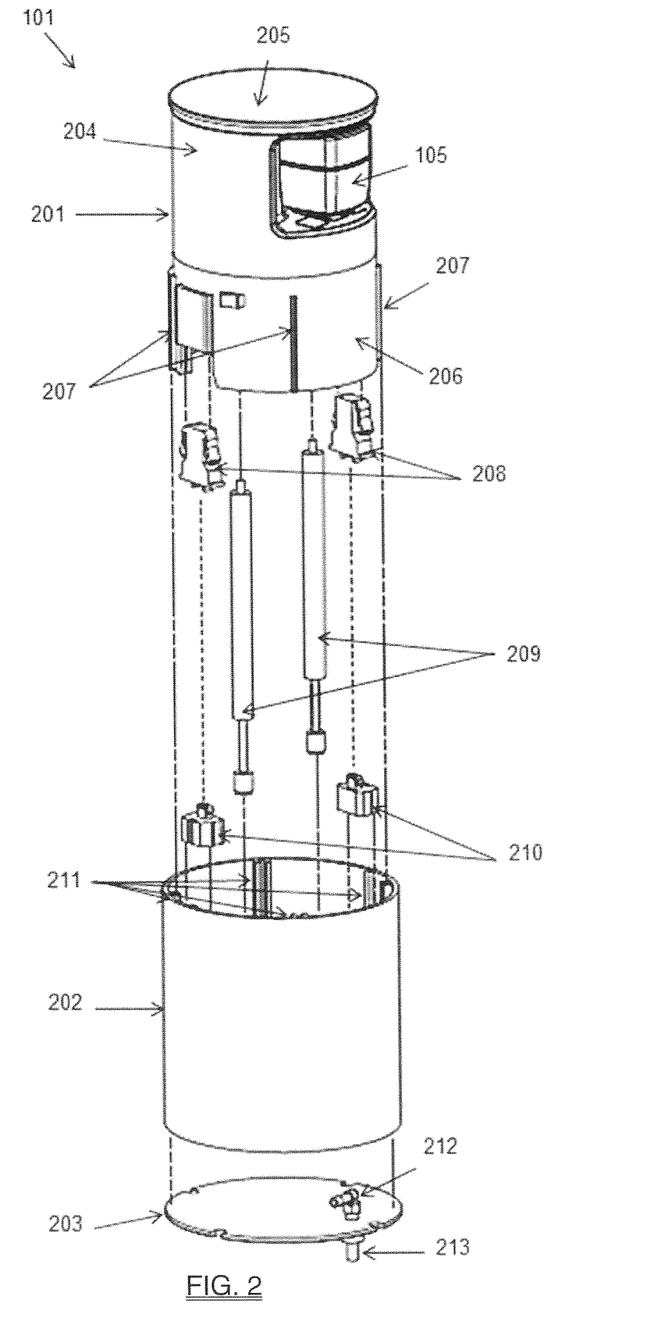
FIG. 2 shows an exploded view of a pop-up part of countertop vacuum system according to an embodiment of the invention.

In FIG. 2 the suction device 101 is shown in an exploded view, wherein the suction device 101 comprises a pop-up arrangement having movable part 201 and fixed or stationary part 202. The movable part 201 is arranged to move in a vertical direction as shown in FIG. 2 within the stationary part 202.

The suction adapter 105 is accommodated in the movable part 201. The movable part 201 has an exposable section 204, which appears above the countertop and the suction device 101 is in the pop-up state. The movable part 201 further has a base section 206, which is designed to carry the exposable section 204, and which has ridges 207 for guiding the base part 206 within the grooves 211 inside the stationary part 202. The ridges 207 in combination with the grooves 211 ensure that the suction device 101, i.e. the movable part 201 can only move in a vertical direction, and not turn around its central axis. Between the movable part 201 and the stationary part 202 springs 209 can be arranged, which in combination with touch latches 208 and strikes 210 allow snap action when the movable part 201 is in a compressed position within the stationary part 202 and a pop-up state as shown in FIG. 1c. A single spring 209 can suffice, however for stability two or more springs 209 can be applied. Moreover in addition to springs 209, also dampers can be used to damp especially the vertical upward motion of the movable part 201. Preferably gas springs are used for springs 209, which usually combine the function of spring and damper. As shown in FIG. 2, the touch latches 208 are accommodated within the base section 206 of the movable part 201, and the corresponding strikes 210 are accommodated within the stationary part 202, however these locations may be mutually reversed.

The movable part 201 can accommodate additional facilities such as AC plugs or sockets for further enhancing ease of use and comfort.

The stationary part 202 can be provided with a base plate 203, which can be mounted against the lower part of the stationary part 202. The base plate 203 can be provided with a vacuum swivel 212. The vacuum swivel 212 can be connected to a duct 213 for connection to the vacuum pump 110, thereby connecting the suction hose 107 and suction adapter 105 to the vacuum pump 110.

The movable part 201 and stationary part 202 are shown as cylindrical objects, however the skilled person will understand that other cross sections such as square, triangular and ellipsoidal, etc. may apply. The exposable section 204 of the movable part 201 has a cover plate 205.

Figure 3A:
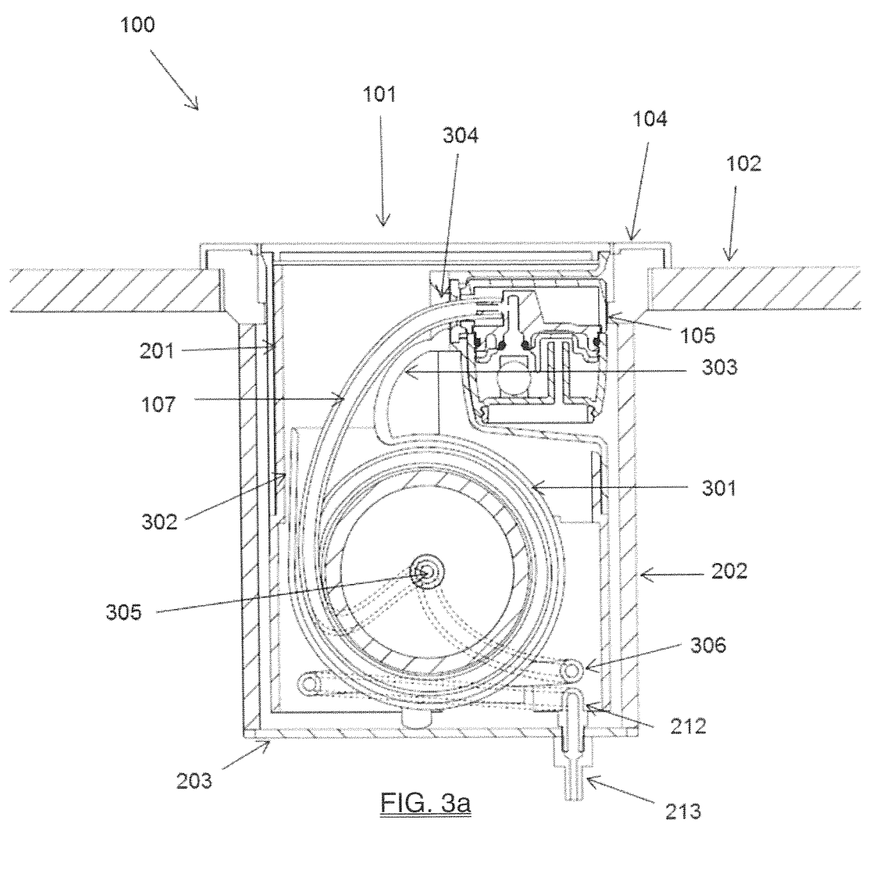
FIG. 3a-3b show a cross section of the countertop vacuum system according to an embodiment of the invention.

In FIG. 3a, a cross section of the countertop vacuum system 100 is the suction device 101 is mounted in an opening of the countertop 102 using a flange 104, which is connected to the stationary part 202 of the suction device 101.

Figure 3B:
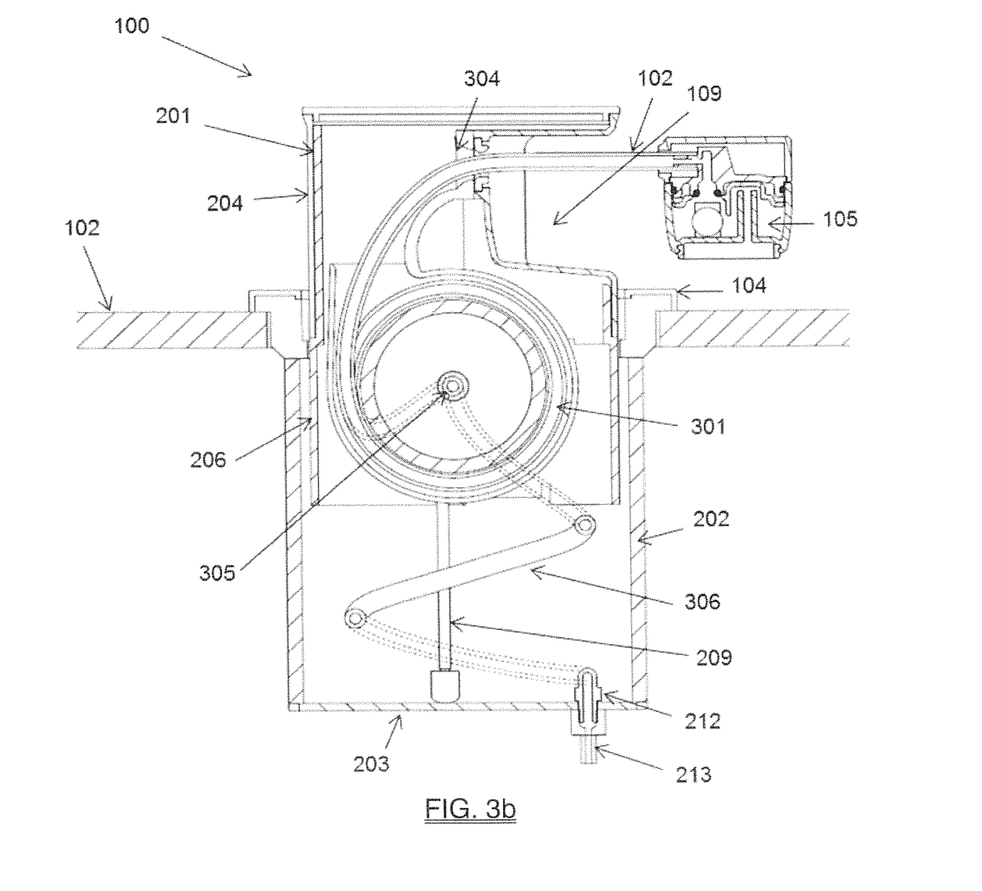

In FIG. 3a the reel 301 is shown in accommodated in the base section 206 of the moveable part 201 of the suction device 101. The reel 301 is accommodated in a reel housing 302, wherein the reel accommodates the suction hose 107 which can be rolled off from the reel 301 when the suction adapter 105 is extracted from the exposable section 204 as is shown in FIG. 3b. When rolling off, or retracting the suction hose 107, the reel 301 revolves around a rotation axis. In FIGS. 3a and 3b, the rotation axis is shown as a hollow hose reel axle 305, to which the suction hose 107 is connected. The suction hose 107 is connected to a vacuum swivel (not shown) on the hose reel axle 305, which in turn is connected via an internal suction hose 306 to the vacuum swivel 212. The suction hose 107 is guided with hose guide 303 to aperture 304, thus allowing in use the suction hose 107 to be rolled off and extracted to the suction device 101, and to be retracted when not in use.

In FIG. 3a, also a cross section of the adapter storage space 109 is shown wherein the suction adapter 105 is accommodated in the resting state of the countertop vacuum system 100.

In FIG. 3a, spring 209 is shown in a compressed state, whereas in FIG. 3b, the spring 209 is shown in an extended state.

Figure 4A:
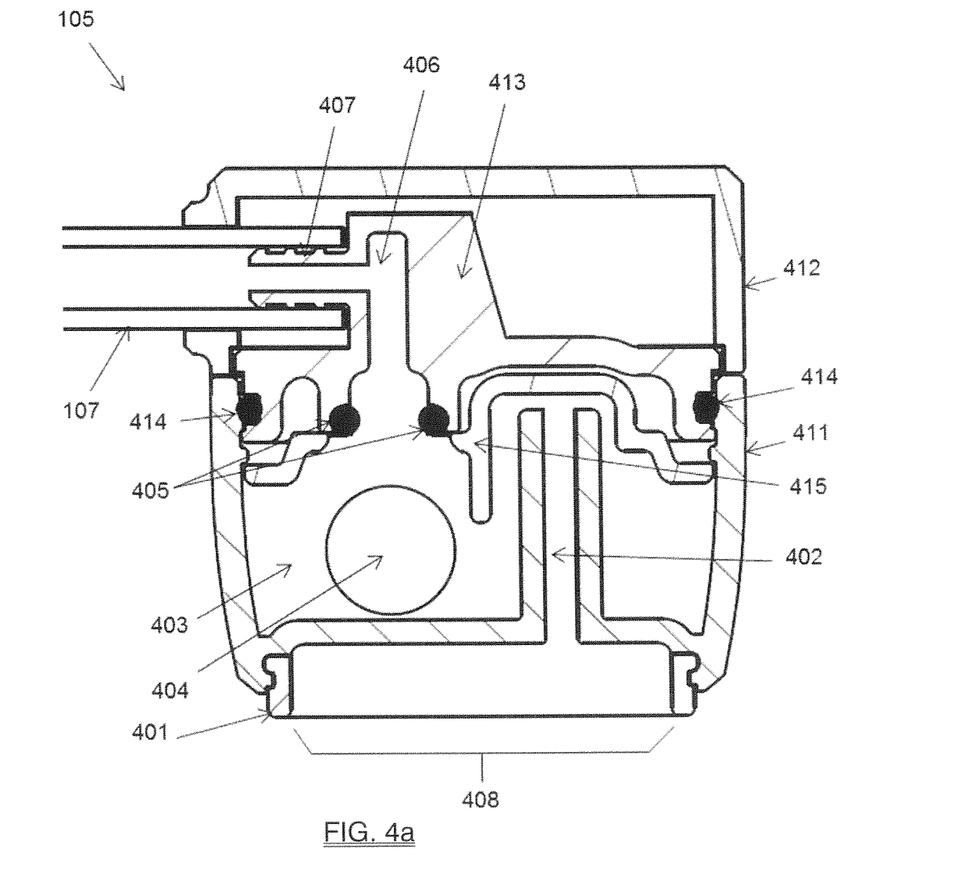
FIG. 4a-4b show a cross section of a suction adapter of a countertop vacuum system according to an embodiment of the invention.
Figure 4B:
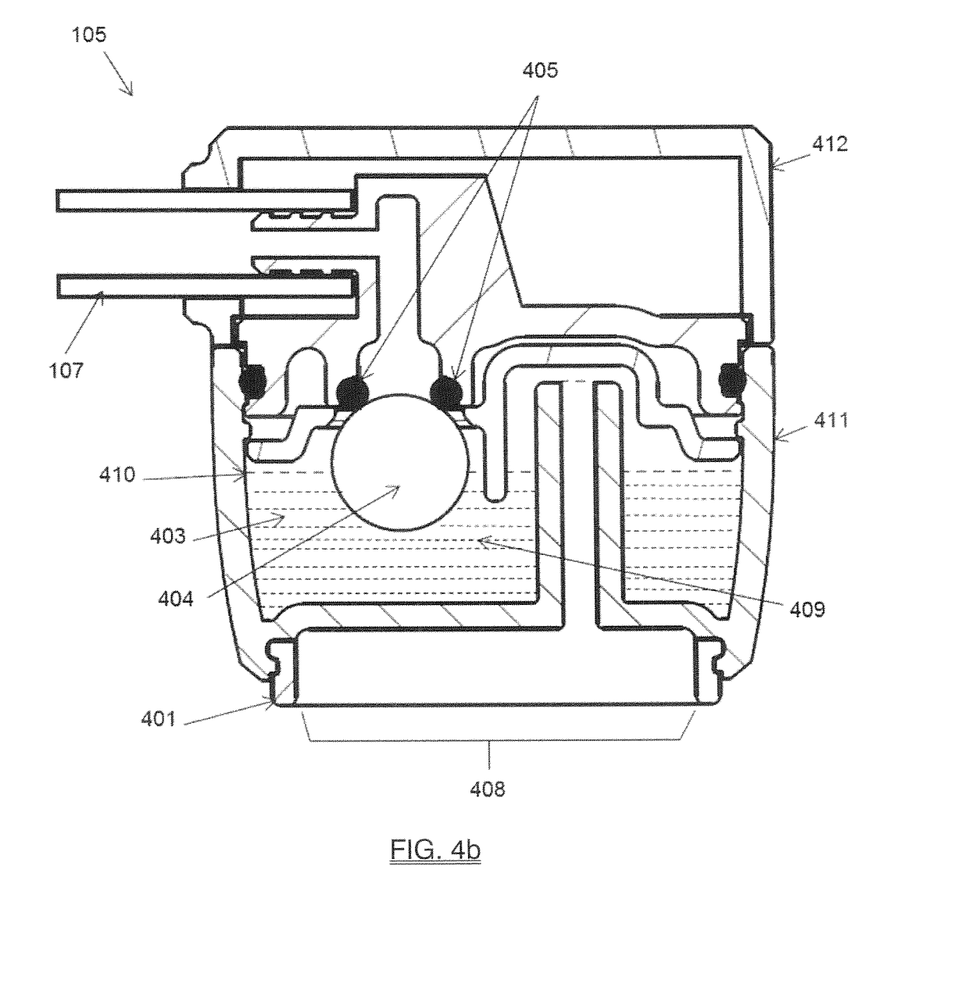

In FIGS. 4a and 4b, a cross section of the suction adapter 105 is shown. The suction adapter 105 has a housing which may comprise an adapter base 411 and an adapter cover 412. A connection element 413 may be provided for connecting the suction hose 107 via hose nipple 407 and channel 406 to the fluid chamber 403 which is accommodated in the adapter base 411. The connection element 413 can be provided with a seal 414, to ensure that the vacuum within the fluid chamber 403 is maintained, leak free. Suction from the suction hose 107 is propagated via fluid chamber 403 to air inlet 402 to the suction nozzle 401 which has a suction opening 408. The suction nozzle 401 can be adapted to fit the suction opening of food containers, such as boxes, or bags, tins, cans or any container provided with a suction nipple or opening corresponding to the suction nozzle 401. The suction nozzle 401 can be provided with a sealing ring of flexible material such as rubber for guaranteeing an air tight connection between the suction adapter 105 and the food container, especially plastic bags.

In fluid chamber 403, a float 404 is provided which can be guided by guide element 415 to seal 405. In FIG. 4b, the suction adapter 105 is shown having a fluid 409 present in the fluid chamber up to level 410. The float 404 rests against the seal 405 and closes passage of fluid and air to the air inlet 402 when the fluid level 410 is high enough, thus preventing fluid 409 in the fluid chamber 403 from flowing into the suction hose 107. By closing off the seal 405 a pressure drop below the preset pressure threshold value may occur within the suction device, which may be detected by the control unit via the pressure sensor. The control unit can be arranged to turn off the vacuum pump in this case, as described. The control unit can for example be accommodated within the common housing 103.

It will be clear to the person skilled in the art, that the shape of the float 404 is not limited to the shape as depicted in FIGS. 4a and 4b. It may also be cylindrical for example. The seal 405 may be connected to the float 404, which will seal off duct 406 when the float 404 is driven upward by fluid 409 within the fluid chamber 403.

Figure 5:
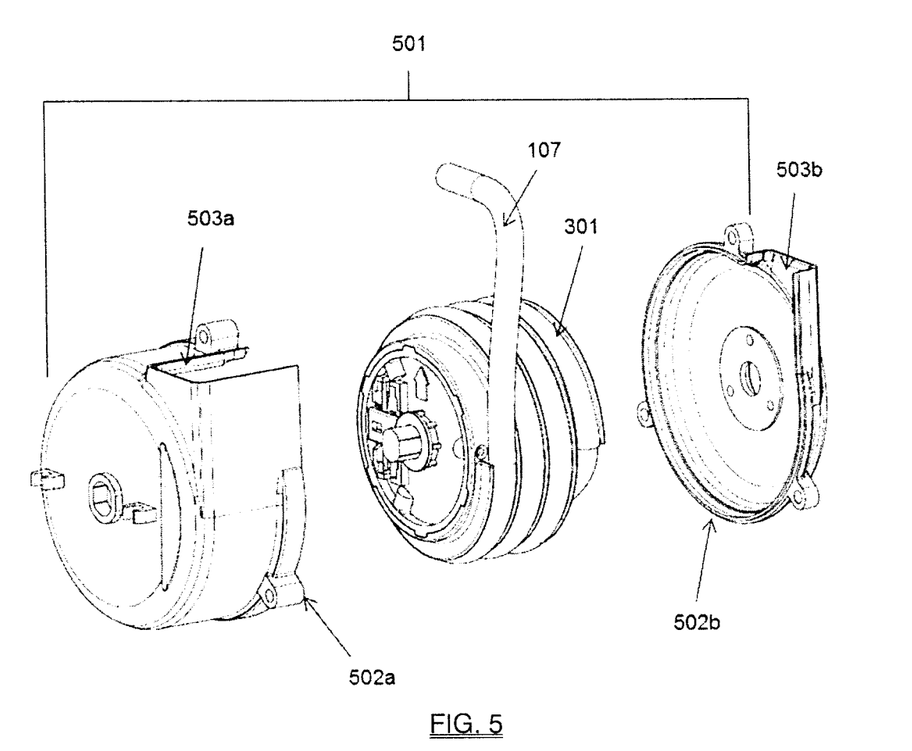
FIG. 5 shows an exploded view of a reel of a countertop vacuum system according to an embodiment of the invention.

In FIG. 5 the reel 301 is shown having the suction hose 107 coiled up thereon. The reel 307 is accommodated in a housing 501, which in this example has parts 502a, 502b in combination enclosing the reel 301, and allowing the suction hose 107 to be rolled off via suction hose exit opening recesses 503a, 503b which extends the parallel to the reel 301, thereby allowing the position from where the suction hose 107 emanates from the suction hose exit opening 503a, 503b to vary its exit position corresponding to the angular displacement of the reel 301 relative to the housing 501.

It will be clear to a person skilled in the art that the scope of the present invention is not limited to the examples discussed in the foregoing but that several amendments and modifications thereof are possible without deviating from the scope of the present invention as defined by the attached claims. In particular, combinations of specific features of various aspects of the invention may be made. An aspect of the invention may be further advantageously enhanced by adding a feature that was described in relation to another aspect of the invention. While the present invention has been illustrated and described in detail in the figures and the description, such illustration and description are to be considered illustrative or exemplary only, and not restrictive.

The present invention is not limited to the disclosed embodiments. Variations to the disclosed embodiments can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. The mere fact that certain measures are recited in mutually different dependent claims does not indicate that a combination of these measures cannot be used to advantage. Any reference numerals in the claims should not be construed as limiting the scope of the present invention.

REFERENCE NUMERALS 100 countertop vacuum system
101 suction device
102 countertop
103 Housing
104 Flange
105 suction adapter 106 Retention wall
107 External suction hose
108 Control button
109 Adapter storage space
201 Movable part
202 Stationary part
203 Base plate
204 Exposable section
205 cover plate
206 Base section
207 Ridge
208 Touch latch
209 Spring
210 Strike
211 Groove
212 Vacuum swivel
213 duct
301 Reel
302 Reel housing
303 Hose guide
304 Aperture
305 Hose reel axle
306 Internal suction hose
401 Suction nozzle
402 Air inlet
403 Fluid chamber
404 Float
405 Seal
406 duct
407 Hose nipple
408 Suction opening
409 Fluid
410 Fluid level
411 Adapter base
412 Adapter cover
413 Connection element
414 Seal
501 Housing
502a, 502b reel housing parts
503a, 503b Suction hose exit opening recess

What is claimed is:

1. A countertop vacuum system, comprising:
a vacuum pump;
a suction device, comprising
a pop-up arrangement, adapted for being mounted in an opening of the countertop, comprising a movable part and a stationary part, the stationary part having connecting means for mounting in the countertop opening and below a countertop working surface, the movable part being arranged for moving relative to the stationary part and for at least partially extending through the countertop opening;
a suction hose connected to the vacuum pump,
wherein the suction hose is arranged extendable from an inner space of the movable part to the outside of the movable part;
a suction adapter connected to the suction hose;
wherein the suction adapter is provided with an interface for applying suction to a container,
wherein the movable part of the pop-up arrangement comprises:
an upper part for alternatively appearing above a top surface of the countertop in an operational state and staying below the countertop top surface in a resting state, wherein an aperture is arranged in the upper part; and
a lower part, having first guide means for cooperating with second guide means of the stationary part,
wherein the upper part has an adapter storage space for accommodating the suction adapter;
wherein the adapter storage space is provided with at least one control button configured to allow control of the countertop vacuum system; and wherein the lower part comprises a reel for coiling up and unwinding the suction hose; and, third guide means for guiding the suction hose to the aperture.

2. The countertop vacuum system according to claim 1, wherein the movable part of the pop-up arrangement is slidably arranged within the stationary part.

3. The countertop vacuum system according to claim 2, the pop-up arrangement further comprising:
at least one compressible member between the movable part and the stationary part;
at least one snap-fit connection between the movable part and the stationary part; and
guide means between the movable part and the stationary part.

4. The countertop vacuum system according to claim 3, wherein the reel has a horizontally oriented hose reel axle.

5. The countertop vacuum system according to claim 4, wherein the adapter storage space is provided with retention elements for retaining the suction adapter.

6. The countertop vacuum system according to claim 5, wherein the stationary part and the vacuum pump are accommodated in a common housing at a lower side of the countertop, further comprising a control unit for controlling operation of the vacuum pump, and wherein the at least one control button is communicatively connected to the control unit for controlling operation of the control unit.

7. The countertop vacuum system according to claim 1, the pop-up arrangement further comprising:
at least one compressible member between the movable part and the stationary part;
at least one snap-fit connection between the movable part and the stationary part;
guide means between the movable part and the stationary part.

8. The countertop vacuum system according to claim 1, wherein the reel has a horizontally oriented hose reel axle.

9. The countertop vacuum system according to claim 1, wherein the adapter storage space is provided with retention elements for retaining the suction adapter.

10. The countertop vacuum system according to claim 1, wherein the stationary part and the vacuum pump are accommodated in a common housing at a lower side of the countertop.

11. The countertop vacuum system according to claim 1, further comprising a control unit for controlling operation of the vacuum pump.

12. The countertop vacuum system according to claim 11, wherein the at least one control button is communicatively connected to the control unit for controlling operation of the control unit.

13. The countertop vacuum system according to claim 1, wherein the suction adapter is provided with a suction channel connected to the suction hose for clearing air from a container.

14. The countertop vacuum system according to claim 13, wherein the suction channel comprises:
a first duct, fluidly connected to the suction opening of the adapter interlace;
a fluid chamber connected to the first duct;

a second duct for connecting the fluid chamber with the suction hose;

a fluid lock disposed between the fluid chamber and the second duct for blocking the suction channel when a fluid level in the fluid chamber exceeds a predetermined threshold.

15. The countertop vacuum system according to claim 13, wherein the fluid lock comprises a float and a seal.

* * * * *